United States Patent

Wei et al.

Patent Number: 5,820,945
Date of Patent: Oct. 13, 1998

[54] METHOD OF APPLYING LUBRICANT TO MAGNETIC DISC

[75] Inventors: Bo Wei, Santa Clara, Calif.; Dallas W. Meyer, Burnsville; Venkat R. Koka, Vadnais Heights, both of Minn.

[73] Assignee: Seagate Technology, Inc., Scotts Valley, Calif.

[21] Appl. No.: 831,050

[22] Filed: Apr. 1, 1997

Related U.S. Application Data

[60] Provisional application No. 60/011,179 Feb. 5, 1996.

Related U.S. Application Data

[62] Division of Ser. No. 680,591, Jul. 12, 1996, Pat. No. 5,650,900.

[51] Int. Cl.⁶ ........................................................ B05D 3/00
[52] U.S. Cl. ........................... 427/555; 427/130; 427/131; 427/346; 427/385.5; 427/407.1; 427/555; 427/596

[58] Field of Search ..................................... 427/130, 131, 427/346, 407.1, 385.5, 555, 596

[56] References Cited

U.S. PATENT DOCUMENTS 4,920,919  5/1990  Matsudaira et al. ..................... 118/725

*Primary Examiner*—Bernard Pianalto
*Attorney, Agent, or Firm*—Kinney & Lange, P.A.

[57] ABSTRACT

A magnetic disc for a computer disc drive has distinct zones of differing lubricant thickness. A bonded+mobile zone covers a portion of the disc which preferably coincides with the landing zone. A zone of different lubricant thickness, such as lubricant-free, bonded-only or mostly-bonded, covers a different portion of the disc such as over the data zone. After a uniform layer of lubricant is coated over the disc surface, lubricant can be removed from distinct zones by solvent removal over a periphery of the disc and by removal by laser. The lubricant removal from distinct zones can occur either before or after bonding. Multiple lubricant thickness zones may be used, and the lubricant thickness profile over the entire disc can be controlled as desired.

20 Claims, 4 Drawing Sheets

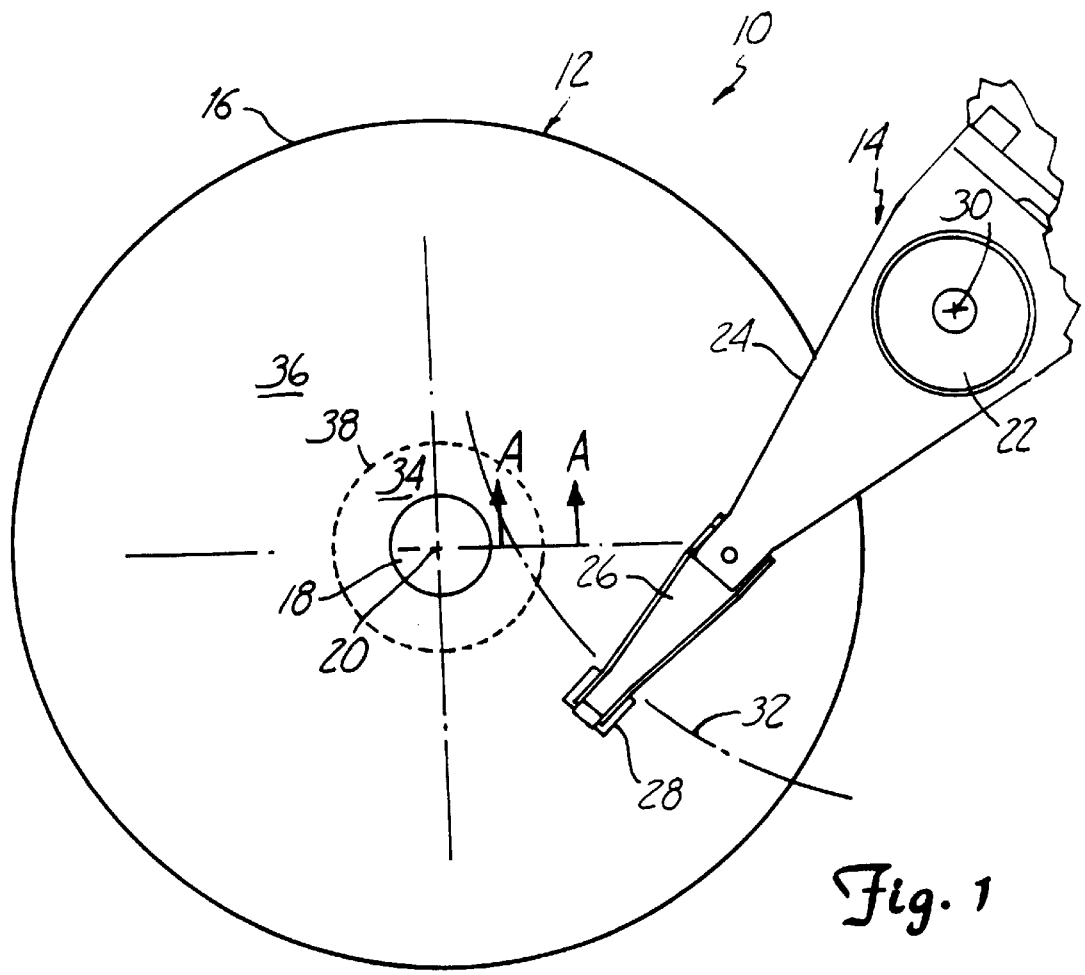
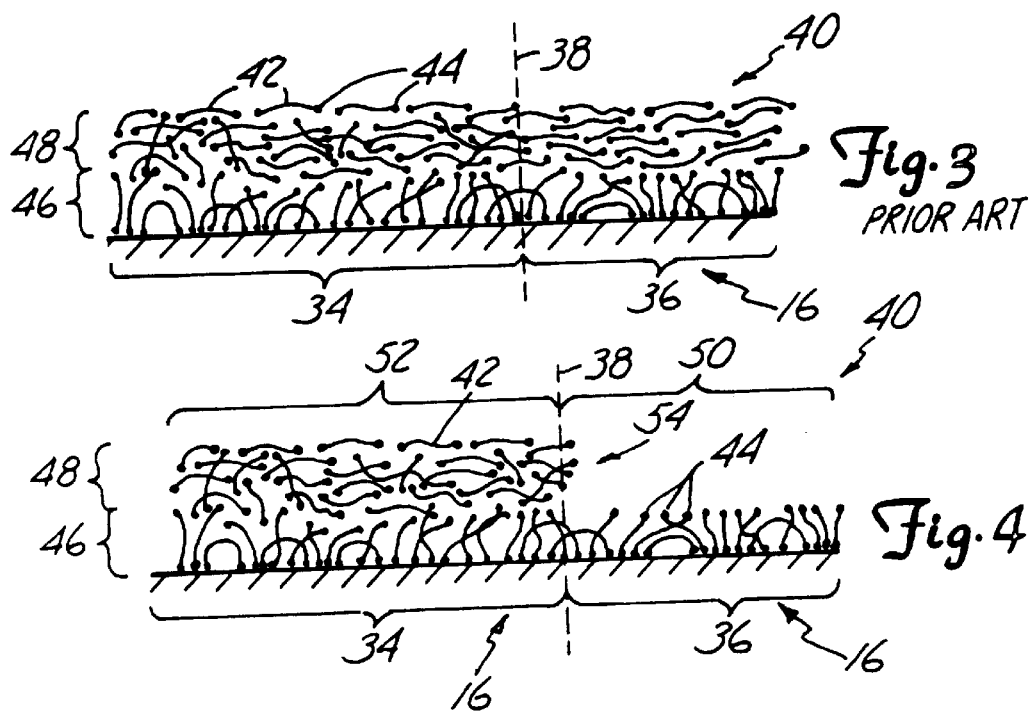

METHOD OF APPLYING LUBRICANT TO MAGNETIC DISC

This is a divisonal of application Ser. No. 08/680,591, filed Jul. 12, 1996, U.S. Pat. No. 5,650,900, which claims the benefit of provisional application Ser. No. 60/011,179 filed on Feb. 5, 1996, entitled "Varying or Zoned Lubricant Thickness With Mobile+Bonded and/or Bonded Only Lubricant for Thin Film Disc Applications" now abandoned.

BACKGROUND OF THE INVENTION

The present invention relates to magnetic discs for use in computer disc drives, and, more particularly, to application of the lubricant layer over the magnetic disc surface to enhance tribological performance of an air bearing slider.

Computer disc drives commonly use thin film media to store information in a high-density, high-reliability format: The magnetic layer in thin film media is typically provided by a cobalt alloy film. The cobalt alloy film may be applied at a thickness of around 500 Angstroms over a supporting substrate. The substrate may be nickel-phosphorous plated aluminum coated with a chromium underlayer for the magnetic media.

While thin film media offer important advantages toward higher storage density, the cobalt alloy films are significantly less durable than films composed of the magnetic and alumina particles used in particulate media. To enhance the durability of the disc, a protective layer of a very hard material is applied over the cobalt alloy film. A typical protective layer is an overcoat of sputtered amorphous carbon about 300 Angstroms thick. The amorphous carbon overcoat structure can be thought of as a hybrid between diamond and graphite. Other materials which have been used for overcoats include sputtered ceramic zirconium oxide and amorphous films of silicon dioxide. Overcoat surfaces have been textured to affect the tribology between the slider and the disc. A surface roughness of 50 to 200 Angstroms peak-to-valley is typical.

The overcoat surface is usually lubricated to further reduce wear of the disc due to contact with the magnetic head assembly. The lubricant is typically applied evenly over the disc in a molecularly thin film having a thickness from 10 to 50 Angstroms. Thicker films tend to be spun off by centrifugal forces. Slider-disc interaction, air shear and evaporation may also affect the amount of lubricant on a disc.

In computer disc drives which use air bearing sliders, magnetic discs have two discrete zones which may be defined based on how the slider of the magnetic head assembly travels over the disc surface. A "landing zone" is the zone where the slider containing the read/write transducer lands, rests while the disc drive is off, and takes off from when the disc drive is started up. A "data zone" is the zone where the slider flies over the disc and stores magnetic data. Lubricant is generally applied both to the landing zone and the data zone on the magnetic disc.

When the power is switched on in a disc drive, enough force has to be applied for the slider to overcome the static friction or "stiction" force on the slider. During the relatively low speeds encountered during takeoff and landing, the slider maintains almost constant contact with the disc. Lubricant over the landing zone is important for its contribution toward the stiction force and to minimize wear and drag force during takeoff and landing.

As the speed of the disc increases, the air in contact with the disc surface lifts the slider away from the disc surface such that the magnetic head assembly becomes airborne. During use of the disc drive, the magnetic head assembly is designed to fly over the disc surface without contacting the disc. However, the magnetic head assembly occasionally contacts the disc during use of the disc drive. These in-flight contacts between the slider and the media occur infrequently, but at high speeds. Most of these contacts are caused by collision of the slider with media asperities, third bodies such as corrosion products, or other contaminant particles. Lubricant on the data zone minimizes wear and/or damage to the disc due to these occasional contacts between the flying magnetic head assembly and the disc.

Perfluoropolyethers (PFPEs) are currently the lubricant of choice for thin film recording media. PFPEs are long chain polymers composed of repeat units of small perfluorinated aliphatic oxides such as perfluoroethylene oxide or perfluoropropylene oxide. As a class of compounds, PFPEs provide excellent lubricity, a wide liquid-phase temperature range, low vapor pressure, small temperature dependency of viscosity, high thermal stability, and low chemical reactivity. PFPEs also exhibit low surface tension, resistance to oxidation at high temperature, low toxicity, and moderately high solubility for oxygen. Several different PFPE polymers are available commercially, such as Fomblin Z (random copolymer of $CF_2CF_2O$ and $CF_2O$ units) and Y (random copolymer of $CF(CF_3)CF_2O$ and $CF_2O$) including Z-DOL and AM 2001 from Montedison, Demnum (a homopolymer of $CF_2CF_2CF_2O$) from Daikin, and Krytox (homopolymer of $CF(CF_3)CF_2O$). Fomblin Z and Y are prepared by photooxidation of tetrafluoroethylene and hexafluoropropylene, respectively, and are random copolymers of indicated units. Krytox and Demnum are synthesized via base catalyzed polymerization of perfluoropropylene oxide and trimethylene oxide, respectively. See U.S. Pat. Nos. 3,242,218 and 3,665,041.

The PFPE lubricant is normally applied by dipping the discs in a bath containing a few percent of lubricant in a solvent and gradually removing the discs out of the bath at a controlled rate. The solvent evaporates and leaves behind a layer of lubricant preferably from about 20 to 40 Angstroms thick.

It may be beneficial in some cases to bond some or all of the PFPE lubricant molecules to the surface of the disc. The bonded layer contains lubricant molecules which are chemically or physically bonded to the carbon overcoat on the disc. Bonded lubricant molecules cannot be removed by washing with a solvent. Bonding helps to reduce lubricant which may be lost due to spin-off, evaporation, or chemical displacement. It has also been theorized that bonding of the lubricant helps to lower stiction forces.

Different strategies have been employed for bonding the lubricant molecules to a disc surface to enhance lubricant performance. For instance, the molecules may be chemically bonded to the disc surface. The PFPE lubricant molecules may be terminated by reactive, functional end-groups, such as hydroxyl, carboxyl, or piperonyl. The end groups chemically react with the amorphous carbon overcoat to bond the lubricant to the disc surface. Similarly, polar end groups may be used to bond the lubricant to the disc surface. Lubricant bonding schemes may also involve thermal treatment or exposure to ultra-violet light.

A mobile layer of lubricant may be used on the disc surface, either with or without a bonded layer. The mobile layer contains molecules which are not bonded and can be easily washed away by an appropriate solvent.

With thin film magnetic media decreasing head to media spacing is critical for higher storage densities. Present flying altitudes of magnetic head assemblies over the disc surface are usually in the 100–500 Angstrom range. Still lower flying altitudes are anticipated in the future. As flying altitudes are decreased, the tribology between the slider and disc surface becomes more and more important. While the tribology between a slider and a disc is a function of the properties of the substrate and all the deposited layers, the overcoat and the lubricant are of primary importance. The slider structure also greatly affects the tribology, and sliders are usually formed of fairly hard ceramics such as Mn-Zn ferrite, calcium titanate ($CaTiO_3$) and $Al_2O_3$-TiC.

Stiction is one of the most important and complex tribological phenomenon for disc drives. High stiction forces can lead the disc drive to fail, as the motor may not be strong enough to overcome the initial stiction. The amount of stiction is a function of storage time as well as the normal force between the slider and the disc. The time dependency associated with the storage time is accredited to lubricant migration toward points of contact between the slider and the disc surface, resulting in meniscus forces which increase slowly over time. The time dependency of stiction may also be the result of increased elastic deformation of contacting asperities between the slider and disc surface, as well as the result of slow diffusion of ambient species, mainly, water, into the lubricated junctions followed by displacement of lubricant from the meniscus.

SUMMARY OF THE INVENTION

The present invention is a magnetic disc with distinct zones of differing lubricant thickness. A bonded+mobile zone covers a portion of the disc which preferably coincides with the landing zone. A zone of different lubricant thickness, such as lubricant-free, bonded-only or mostly-bonded, covers a different portion of the disc such as over the data zone. Lubricant can be removed from distinct zones by several different methods, including solvent removal over a periphery of the disc or removal by laser. Lubricant removal can occur either with or without and either before or after lubricant bonding to create the desired lubricant thickness profile.

BRIEF DESCRIPTION OF THE DRAWINGS

FIG. 1 is a top plan view of a computer disc drive with a magnetic disc.

FIG. 3 is a schematic cross-sectional side view of a portion of a magnetic disc taken alone line A—A of FIG. 1, with a prior art lubricant coated surface.

FIG. 4 is a schematic cross-sectional side view of a portion of a magnetic disc taken along line A—A of FIG. 1, with a lubricant coated surface according to a first embodiment of the present invention.

DETAILED DESCRIPTION OF THE PREFERRED EMBODIMENTS

Figure 2:
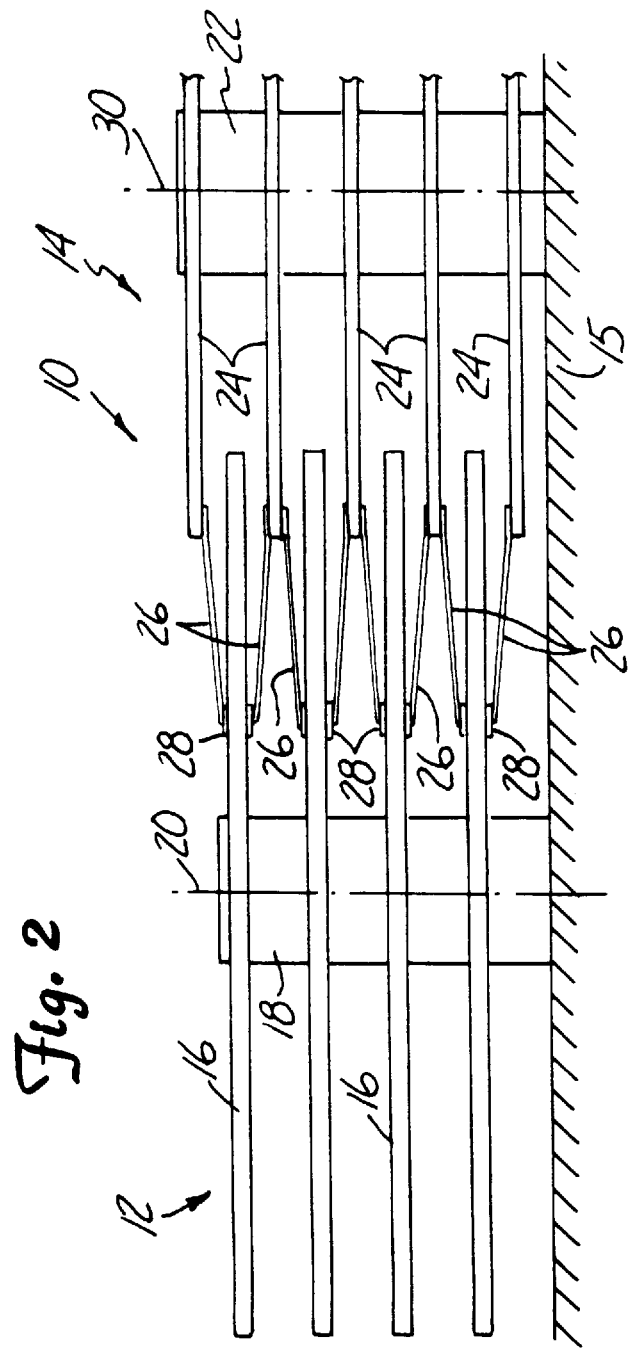
FIG. 2 is a side view of the computer disc drive of FIG. 1.

FIGS. 1 and 2 represent a disc drive structure 10. Disc drive assembly 10 includes disc pack 12 and E-block assembly 14. Disc pack 12 comprises rigid magnetic discs 16 stacked on drive spindle 18. During use of the disc drive 10, drive spindle 18 rotates disc pack 12 about axis 20. E-block assembly 14 comprises servo spindle 22 and a plurality of actuator arms 24. Each actuator arm 24 carries one or two flexure arms or suspension arms 26. Each suspension arm 26 supports an air bearing magnetic head assembly 28 adjacent a surface of a disc 16. As disc 16 rotates at high speed about drive spindle 18 such as 10 m/s or higher relative to magnetic head assembly 28, the aerodynamic properties of magnetic head assembly 28 cause assembly 28 to "fly" above the surface of disc 16. The flying height of magnetic head assembly 28 above disc 16 is a function of the speed of rotation of disc 16, the aerodynamic lift of the slider of magnetic head assembly 28 and the spring tension in suspension arm 26.

E-block assembly 14 is pivotable about pivot axis 30. As E-block assembly 14 pivots, magnetic head assembly 28 mounted at the tip of suspension arm 26 swings through arc 32. As disc 16 rotates beneath magnetic head 28, this pivoting motion allows magnetic head assembly 28 to change track positions on disc 16. Disc 16 has a landing zone 34 where the magnetic head assembly 28 lands, rests while the disc drive 10 is off, and takes off from when the disc drive 10 is started up. Disc 16 has a data zone 36 where the magnetic head assembly 28 flies over the disc 16 and magnetically stores data. The boundary between landing zone 34 and data zone 36 is marked by dashed line 38.

FIG. 3 schematically shows a prior art lubricant layer 40 over a surface of disc 16. Lubricant layer 40 is made up of long chain polymeric molecules 42, such as PFPE-based molecules. The molecules 42 of the PFPE lubricant have functional end groups 44, which are useful in bonding the lubricant molecules 42 to the surface of disc 16. Accordingly, some of the molecules 42 are chemically or polarly attached to disc 16 and make up bonded layer 46. The molecules 42 which are not attached to disc 16 make up mobile layer 48. The molecules 42 of mobile layer 48 can move relative to disc 16, but are believed to be ordinarily stationary and held in place due to van der Walls forces. The lubricant layer 40 of the prior art has almost uniform lubricant thickness across the entire surface of disc 16.

FIG. 4 depicts a first embodiment of the present invention. In this first embodiment, lubricant layer 40 was applied in a uniform application over the surface of disc 16 in accordance with the prior art methods. After application of lubricant layer 40, lubricant of the mobile layer 48 was removed from a bonded-only zone 50 on the disc 16. The removal process over bonded-only zone 50 was not strong enough to remove the bonded molecules, and bonded layer 46 remains in bonded-only zone 50. The lubricant layer 40 over a mobile+bonded zone 52 was not treated in the removal process, and thus mobile+bonded zone 52 retains both a mobile layer 48 and a bonded layer 46. The thickness of lubricant layer 40 has a step-change 54 at the interface between mobile+bonded zone 52 and bonded-only zone 50. This step-change 54 is preferably located to correspond to the boundary 38 between landing zone 34 and data zone 36 on the disc 16.

Any of several different disc processing methods can be used to acheived the mobile+bonded zone 52 and bonded-only zone 50 in desired locations on the disc 16. The first step is to apply lubricant over the surface of discs 16 in accordance with any of the prior art methods. For instance, the discs 16 may be dip lubed in a solvent bath containing a small percentage of the PFPE lubricant. The discs 16 are slowly pulled out of the bath and dried, perhaps in ambient conditions.

If a bonded layer of lubricant is desired, the discs 16 are appropriately treated. For instance, a lubricant which is sensitive to thermal bonding may be used, and the discs 16 may be dried by baking in an oven. Chemical, polar, ultra-violet or other similar bonding techniques may alternatively be used. Now the discs 16 have a lubricant layer 40 of uniform thickness, containing a bonded layer 46 and a mobile layer 48 as shown in FIG. 3.

Figure 5:
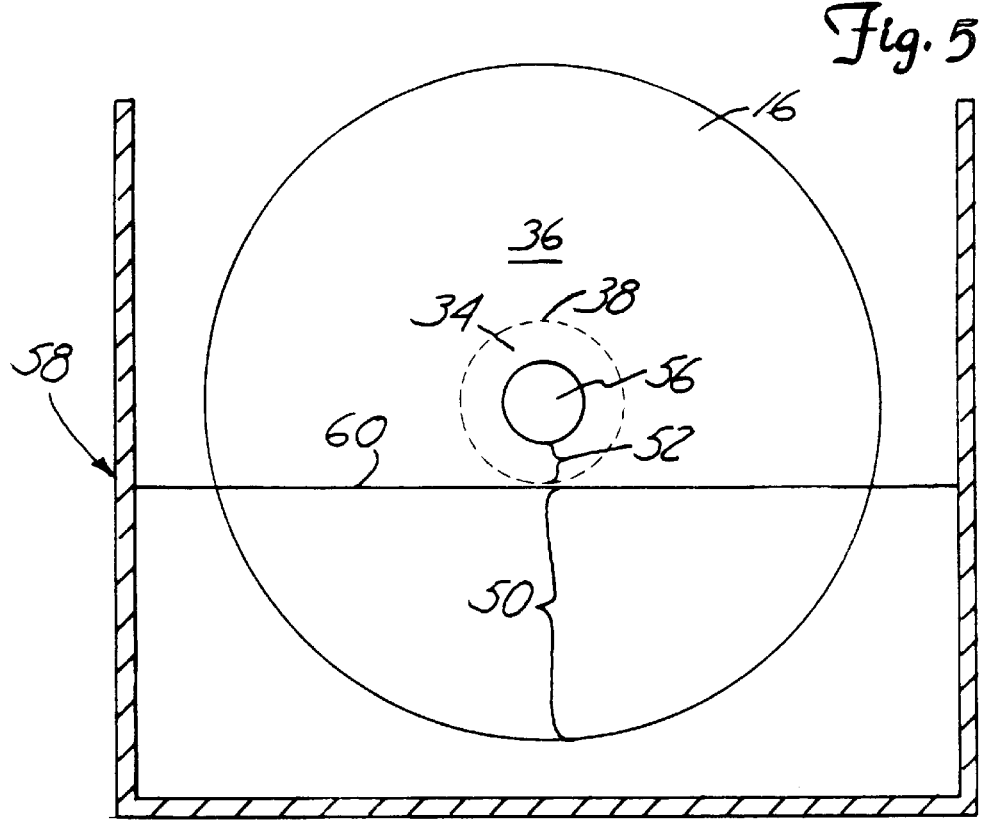
FIG. 5 is a front view of several of the magnetic discs of FIG. 4 during lubricant removal by solvent.
Figure 6:
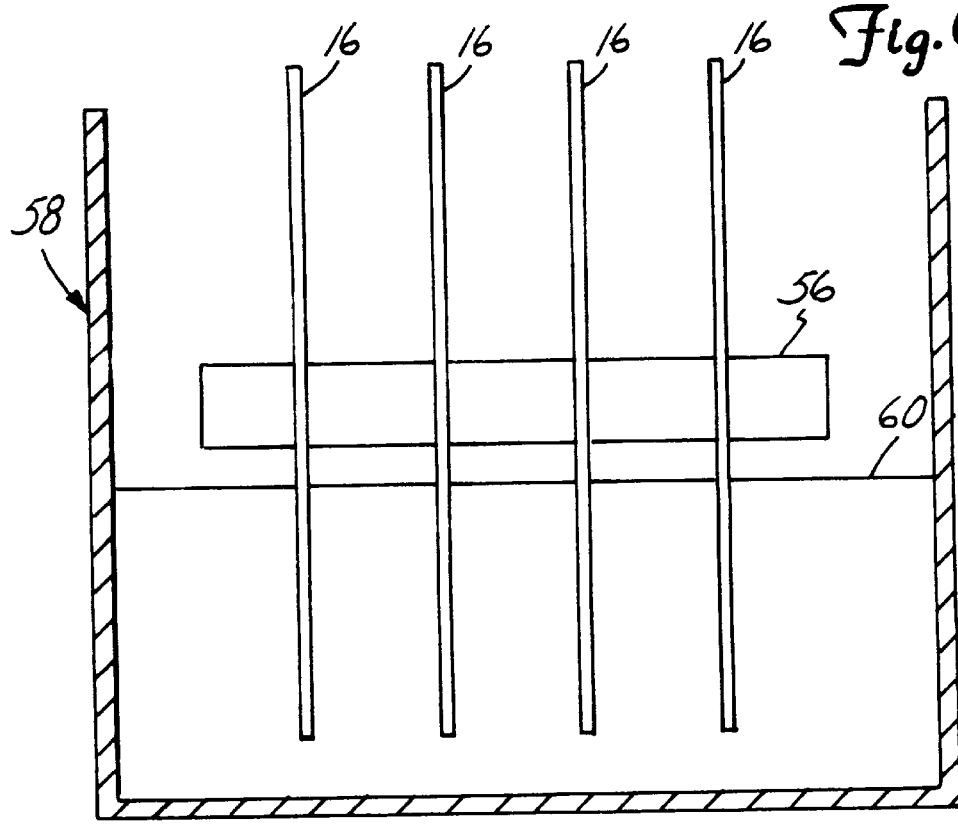
FIG. 6 is a side view of FIG. 5.

One method of changing the thickness of lubricant layer 40 in desired zones is through solvent extraction, shown in FIGS. 5 and 6. Discs 16 are stacked on a mandrel 56. If desired, the discs 16 may be stacked on mandrel 56 earlier in the processing, such as before application of the lubricant. A solvent bath 58 is prepared with an appropriate solvent for the lubricant. For PFPE lubricant, an aggressive flourocarbon solvent such as FC72, PF 6040 or Freon 113 may be appropriate. Mandrel 56 is held above the solvent bath 58 as shown in FIGS. 5 and 6, such that the level of solvent 60 is at desired radius for step-change 54. For instance, the level of solvent 60 may correspond to the radius of the transition boundary 38 between the data zone 36 and the landing zone 34. In this position, a portion of bonded-only zone 50 is beneath the level of solvent 60, while all of the mobile+ bonded zone 52 is above the level of solvent 60.

The mandrel 56 is rotated with the discs 16 in this position, such that solvent 60 is equally applied to the periphery of the disc corresponding to bonded-only zone 50. The number of revolutions (and hence the time) determines how much of the mobile lubricant is removed. To obtain the lubricant thickness profile of the disc 16 of FIG. 4, the speed of rotation and the number of revolutions should be selected as necessary to give enough time for the solvent 60 to entirely wash away the mobile lubricant layer 48 in the bonded-only zone 50.

After the solvent extraction is sufficiently completed, the mandrel 56 is removed from the solvent bath 58 and the lubricant layer 40 is allowed to dry and reach equilibrium.

Figure 7:
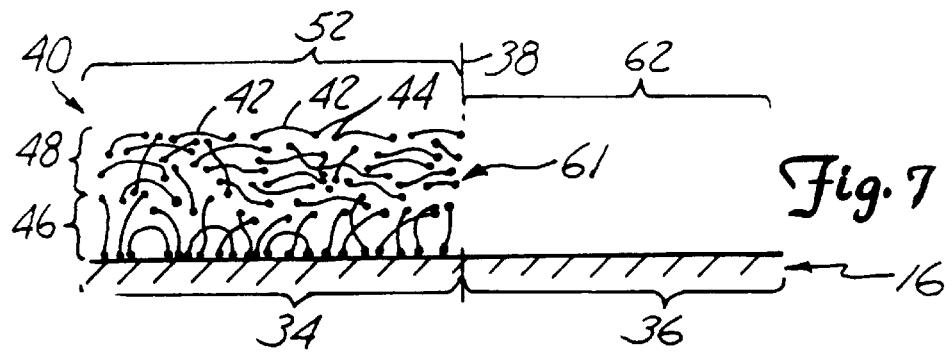
FIG. 7 is a schematic cross-sectional side view of a portion of a magnetic disc taken along line A—A of FIG. 1, with a lubricant coated surface according to a second embodiment of the present invention.

FIG. 7 depicts a second embodiment of the present invention. In this embodiment, a lubricant-free zone 62 is provided along the outer periphery of the disc 16, such as over the data zone 36. Lubricant-free zone 62 is produced similar to the earlier method, except that bonding of lubricant occurs after the solvent extraction. Prior to bonding of bonded layer 46, discs 16 are stacked on a mandrel 56 with a uniform coating of lubricant. Mandrel 56 is held above a solvent bath 58 as shown in FIGS. 5 and 6, such that the level of solvent 60 is at the desired radius for step-change 61. In this position, a portion of lubricant-free zone 62 is beneath the level of solvent 60, while all of the mobile+ bonded zone 52 is above the level of solvent 60. The mandrel 56 is rotated with the discs 16 in this position, such that solvent 60 is equally applied to the periphery of the disc corresponding to lubricant-free zone 62. The speed of rotation and the number of revolutions is selected as necessary to give enough time for the solvent 60 to entirely wash all of lubricant layer 40 over the lubricant-free zone 62. After this lubricant extraction is completed, the molecules 42 of bonded layer 40 are bonded to the surface of disc 16, such as through thermal, chemical, polar, ultra-violet or other similar bonding techniques.

Multiple lubricant thickness zones or a varying lubricant thickness with disc radius can be acheived by changing the radial position of the mandrel 56 relative to the level of solvent 60 as the discs 16 are rotated. A lubricant layer 40 is produced with the thinnest zone at the outer diameter of the discs 16 and zones of increasing thickness at inner diameters. An example of this is shown in FIG. 8.

Figure 8:
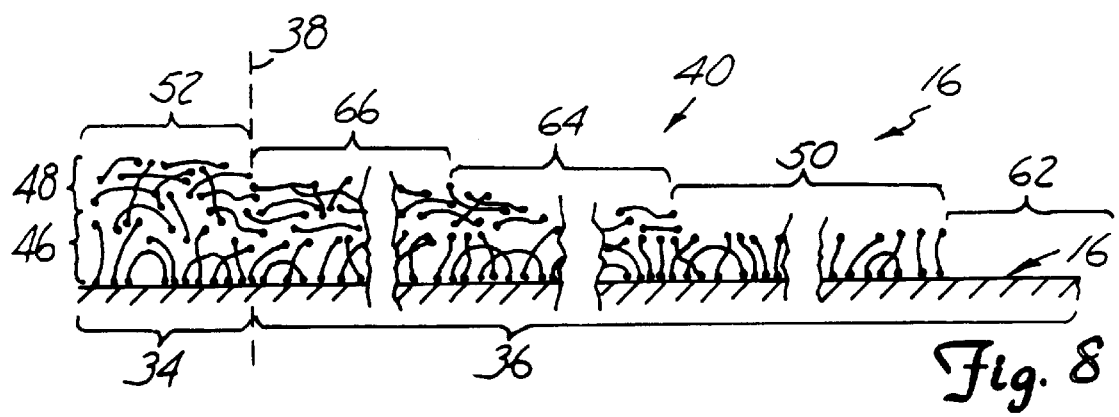
FIG. 8 is a schematic cross-sectional side view of a portion of the magnetic disc of FIGS. 1 and 2 with a lubricant coated surface according to a third embodiment of the present invention.

FIG. 8 depicts a disc 16 which has been processed to created several different lubricant thickness zones. Lubricant-free zone 62, bonded-only zone 50 and mobile+ bonded zone 52 were produced as described above for the first and second embodiments (FIGS. 4 and 7). Also, zones 64 and 66 have been created by submersing these zones in solvent 60 for a period of time too short to completely remove all the mobile lubricant. Accordingly, the thickness of mobile lubricant layer 48 is controlled as desired for zones 64 and 66. Workers skilled in the art will appreciate that the position of the solvent level relative to the axis of the discs 16 can be chanced continuously or in predetermined increments to produce the desired thickness profile for lubricant layer 40, both for bonded layer 46 and mobile layer 48.

The lubricant on the disc 16 can also be removed by methods other than solvent extraction, such as with either a laser beam or electron beam. Lubricant at discrete locations is heated by the laser or electron beam, causing lubricant removal by ablation. That is, the lubricant molecules 42 are sufficiently heated by the beam that they overcome the van der Walls forces holding the molecules to the surface of disc 16 and are removed by vaporization.

To demonstrate the laser beam process, a laser beam was used to remove the lubricant in a portion of the data zone of a finished disc. The thickness distribution of the lubricant of the processed disc was mapped by a lube mapper and is graphed in FIG. 9. The lube mapper uses ultraviolet light to illuminate the disc surface. A portion of the electons emitted from the carbon overcoat layer of the disc are retained in the lubricant layer based on the thickness of the lubricant. Emitted electrons are collected by a sensor and counted. A thicker lubrication layer will have less electron emission, thus less in the number of counts.

Figure 9:
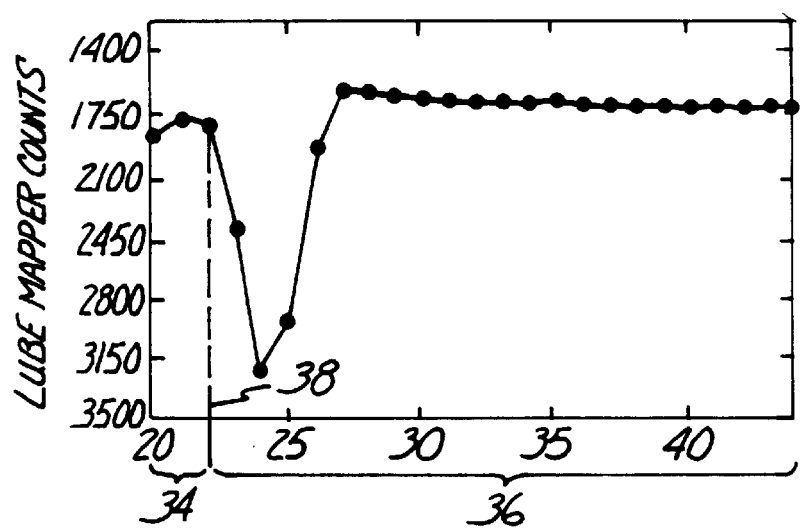
FIG. 9 is a graph of lubricant thickness over a magnetic disc with a lubricant coated surface according to a fourth embodiment of the present invention.

FIG. 9 illustrates electron counts as function of radial position of a disc which has been processed by the laser technique. The affected area was between 22–27 mm in radius, at an inner diameter of the data zone 36. The data indicates that the zone processed by the laser beam exhibits significantly higher counts. The higher count indicates thinner lubricant. A contrast with similar data from a Freon washed disc surface reveals that the originally applied lubricant can be totally or partially removed in a desired thickness profile by appropriately selecting laser beam energy in each zone.

The present invention provides several advantages over the prior art, and particularly produces markedly improved results in reducing stiction. It is believed that the beneficial results are due to reduced lubricant transfer during flying. As the flying height becomes increasingly low to increase storage density, more and more physical and chemical interactions take place between the disc 16 and the magnetic head assembly 28 during flying. One of these interactions is the gradual transfer of non-bonded liquid lubricant from the surface of disc 16 to the slider 28, which occurs when using a PFPE lubricant despite the low vapor pressure and other beneficial properties of PFPE lubricants. The transfer of liquid lubricant is possibly due in part to a very high air pressure gradient adjacent to the slider 28. The transfer of liquid lubricant may also occur in part due to the occasional high speed contact between the flying magnetic head assembly 28 and the surface of disc 16. The lubricant pick-up phenomenon has been observed to be more pronounced for smoother discs.

It is believed that this buildup of liquid lubricant on the slider 28 while flying contributes significantly to stiction between the slider 28 and the disc 16. Liquid lubricant can accumulate anywhere on the airborne slider 28, but is typically confined near the trailing edge or in the cavity if the slider 28 has a cavity. When the slider 28 comes to rest after a power off, it is believed that the lubricant migrates back to the head/disc gap. Excess lubricant localized between the slider 28 and the disc 16 floods the interface and the contacting asperities, causing increased stiction.

A consistent lubricant layer 40 having both a bonded layer 46 and a mobile layer 48 is desired in the landing zone 34. A consistent lubricant layer 40 of some minimal thickness is helpful in reducing the stiction force on the slider 28. A consistent lubricant layer 40 is also very important in the "sliding" regime, when the slider 28 maintains a dragging contact with the disc during takeoff and landing. Lubricant over the landing zone 34 is important for its contribution toward the stiction force and to minimize wear and drag force during takeoff and landing.

The interaction between the slider 28 and the disc 16 is different in the data zone 36, where the slider 28 makes only occasional contact with disc 16. In contrast to the landing zone 34, the data zone 36 may not need a mobile lubricant layer 48. A bonded-only layer 50 of lubricant on the data zone 36 may be very useful in protecting occasional head/disc contact, and also offer some corrosion protection.

Thus, a thin film disc with varying or zoned lubricant thickness, such as with a mobile+bonded zone 52 over the landing zone 34 and a bonded-only zone 50 over the data zone 36, is desirable. The present invention allows not only for these two distinct zones of different thickness, but also allows for as many additional distinct zones of different thickness as desired. The control of the thickness profile of the lubricant as provided by this invention is important toward future thin film disc design, especially as the industry's understanding of the tribology between the slider and the lubricated disc becomes more and more detailed and developed. For instance, further experimentation in this area may reveal that profiles of lubricant thickness other than those particularly discussed herein lead to even more beneficial results.

Although the present invention has been described with reference to preferred embodiments, workers skilled in the art will recognize that changes may be made in form and detail without departing from the spirit and scope of the invention. For instance, molecules 42 are described as being PFPE-based, such as Fomblin Z and Y, Z-DOL, AM 2001, Demnum and Krytox. However, workers skilled in the art will realized that the present invention is applicable to all types of lubricants which can be removed with a solvent or otherwise from a disc surface, and is not limited to PFPE lubricants and fluorocarbon solvents. Similarly, workers skilled in the art will appreciate that the present invention is not in any way limited to the disc drive shown but is equally applicable to a wide variety of disc drive structures.

What is claimed is:

1. A method of fabricating a magnetic disc for use in a computer disc drive, the method comprising;

providing a disc having an axis, the disc having a first zone and a second zone located radially outward from the first zone, the disc being adapted to magnetically store information;

applying a substance in a layer over the first zone and the second zone;

placing the disc with a portion of the second zone in a solvent with the axis of the disc outside the solvent, the solvent being liquid and being capable of dissolving the substance; and rotating the disc about the axis such that all of the second zone passes through the solvent.

2. The method of claim 1, further comprising the steps of:

placing the disc at a second location of the axis with respect to the solvent; and rotating the disc about the axis such that a radial portion of the second zone passes through the solvent.

3. The method of claim 1, wherein all of the substance layer over the second zone is removed.

4. The method of claim 1, wherein the step of applying substance in a layer comprises:

preparing a liquid mixture of the substance in solution;

dipping the disc into the liquid mixture to create a mixture-coated disc; and drying the mixture-coated disc to evaporate the solvent and leave a layer of the substance over the disc.

5. The method of claim 4, wherein the step of drying the mixture-coated disc comprises:

heating at least a portion of the mixture-coated disc to thermally bond the substance over at least a portion of the first zone and the second zone.

6. The method of claim 1, further comprising the step of installing the disc in a computer disc drive.

7. A method of applying lubricant to a magnetic disc for use in a computer disc drive, the method comprising:

providing a disc having a landing zone and a data zone located radially outward from the landing zone, the data zone being adapted to magnetically store information;

applying a lubricant layer over the landing zone and the data zone; and removing at least a portion of the lubricant layer over the data zone while retaining the lubricant layer over the landing zone.

8. The method of claim 7, wherein the data zone comprises a carbon overcoat over a magnetic media, and wherein the step of applying lubricant includes:

bonding the lubricant to the carbon overcoat.

9. The method of claim 7, wherein the step of applying lubricant comprises:

preparing a mixture of lubricant in solvent;

dipping the disc into the mixture to create a mixture-coated disc; and drying the mixture-coated disc to evaporate the solvent and leave a lubricant layer over the disc.

10. The method of claim 9, wherein the step of drying the mixture comprises:

heating at least a portion of the mixture-coated disc to thermally bond the lubricant over at least a portion of the data zone and the landing zone.

11. The method of claim 10, wherein the heating of the mixture-coated disc is performed by a laser beam.

12. The method of claim 10, wherein the heating of the mixture-coated disc is performed by baking the mixture-coated disc to bond the lubricant over all of the data zone and the landing zone.

13. The method of claim 10, wherein only a portion of the mixture-coated disc is heated to bond the lubricant over only the heated portion of the mixture-coated disc.

14. The method of claim 7, wherein all of the lubricant layer over the data zone is removed.

15. The method of claim 7, wherein the step of removing at least a portion of the lubricant layer over the data zone comprises:

projecting a laser beam onto the data zone.

16. The method of claim 7, wherein the step of removing at least a portion of the lubricant layer over the data zone comprises:

projecting an electron beam onto the data zone.

17. The method of claim 7, wherein the step of removing at least a portion of the lubricant layer over the data zone comprises:

placing the disc with a portion of the data zone in a solvent for the lubricant and with an axis of the disc outside the solvent; and rotating the disc about the axis such that all of the data zone passes through the solvent.

18. The method of claim 17, further comprising the steps of:

placing the disc at a second location of the axis with respect to the solvent; and rotating the disc about the axis such that a radial portion of the data zone passes through the solvent.

19. A method of applying lubricant to a magnetic disc for use in a computer disc drive, the method comprising;

providing a disc adapted to magnetically store information;

applying a lubricant layer over at least a portion of the disc to produce a lubricant-coated zone;

heating only a portion of the lubricant-coated zone to thermally bond lubricant of the heated portion of the lubricant-coated zone to the disc and thereby produce a disc with bonded lubricant and non-bonded lubricant; and removing at least a portion of the non-bonded lubricant.

20. The method of claim 19, wherein the step of heating only a portion of the lubricant-coated zone is performed by a laser beam.

* * * * *

UNITED STATES PATENT AND TRADEMARK OFFICE
CERTIFICATE OF CORRECTION

PATENT NO. : 5,820,945
DATED : OCTOBER 13, 1998
INVENTOR(S) : BO WEI ET AL.

It is certified that error appears in the above-identified patent and that said Letters Patent is hereby corrected as shown below:

Col. 3, line 46, delete "alone", insert – along--

Col. 6, line 19, delete "chanced", insert --changed--

Signed and Sealed this

Fourteenth Day of September, 1999

Q. TODD DICKINSON

Attest:

Attesting Officer

Acting Commissioner of Patents and Trademarks